(12) United States Patent
Tanaka et al.

(10) Patent No.: US 10,270,937 B2
(45) Date of Patent: Apr. 23, 2019

(54) IMAGE PROCESSING DEVICE, IMAGE FORMING APPARATUS, IMAGE PROCESSING METHOD, AND NON-TRANSITORY RECORDING MEDIUM TO CORRECT AN INCLINATION OF IMAGE DATA IN THE IMAGE MEMORY RELATIVE TO AN OUTPUT MEDIUM

(71) Applicants: Tomonori Tanaka, Kanagawa (JP);
Naoki Ohta, Kanagawa (JP);
Mitsutaka Iwasaki, Kanagawa (JP);
Yuuto Watanabe, Kanagawa (JP)

(72) Inventors: Tomonori Tanaka, Kanagawa (JP);
Naoki Ohta, Kanagawa (JP);
Mitsutaka Iwasaki, Kanagawa (JP);
Yuuto Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 128 days.

(21) Appl. No.: 15/371,639

(22) Filed: Dec. 7, 2016

(65) Prior Publication Data
US 2017/0187917 A1    Jun. 29, 2017

(30) Foreign Application Priority Data
Dec. 25, 2015    (JP) .................................. 2015-254837

(51) Int. Cl.
*H04N 1/00* (2006.01)
*H04N 1/387* (2006.01)
(Continued)

(52) U.S. Cl.
CPC ......... *H04N 1/3878* (2013.01); *H04N 1/2104* (2013.01); *H04N 1/2158* (2013.01);
(Continued)

(58) Field of Classification Search
CPC .................................................. H04N 1/3878
See application file for complete search history.

(56) References Cited

U.S. PATENT DOCUMENTS 5,144,337 A    9/1992    Imamura et al.
6,154,286 A * 11/2000    Konno ................. G03G 15/221
                                                    358/1.13
(Continued)

FOREIGN PATENT DOCUMENTS

| JP | 2004-170755 | 6/2004 |
|----|-------------|--------|
| JP | 2009-135887 | 6/2009 |
| JP | 2010-064254 | 3/2010 |

*Primary Examiner* — Benjamin O Dulaney
(74) *Attorney, Agent, or Firm* — Harness, Dickey & Pierce, P.L.C.

(57) ABSTRACT

An image processing device includes an external memory interface to write image data to an image memory, and an inclination correction circuit. The inclination correction circuit generates coordinate information based on inclination information, detects, from the coordinate information, a minimum sub-scanning coordinate in each of divided areas of the image data, generates first read addresses for reading the divided areas of the image data from the image memory based on the minimum sub-scanning coordinate, reads the divided areas of the image data from the image memory based on the first read addresses, writes the divided areas of the image data to an internal memory, generates second read addresses for reading the divided areas of the image data from the internal memory based on the coordinate information, and reads the divided areas of the image data from the internal memory based on the second read addresses.

15 Claims, 12 Drawing Sheets

(51) Int. Cl.
*H04N 1/21* (2006.01)
*H04N 1/32* (2006.01)
(52) U.S. Cl.
CPC ....... *H04N 1/3247* (2013.01); *H04N 1/32101* (2013.01); *H04N 2201/0094* (2013.01); *H04N 2201/325* (2013.01); *H04N 2201/3242* (2013.01); *H04N 2201/3277* (2013.01)

(56) References Cited

U.S. PATENT DOCUMENTS

| | | | | |
|---|---|---|---|---|
| 2009/0002523 | A1* | 1/2009 | Maekawa | G06T 3/00 348/231.2 |
| 2009/0109503 | A1* | 4/2009 | Namba | H04N 1/047 358/488 |
| 2010/0253981 | A1* | 10/2010 | Higashiyama | H04N 1/3878 358/3.26 |
| 2011/0235946 | A1* | 9/2011 | Hosier | H04N 1/00721 382/309 |
| 2017/0126915 | A1* | 5/2017 | Ishido | H04N 1/0057 |
| 2017/0187916 | A1* | 6/2017 | Ohta | H04N 1/2104 |
| 2017/0195518 | A1* | 7/2017 | Watanabe | H04N 1/00068 |

* cited by examiner

IMAGE PROCESSING DEVICE, IMAGE FORMING APPARATUS, IMAGE PROCESSING METHOD, AND NON-TRANSITORY RECORDING MEDIUM TO CORRECT AN INCLINATION OF IMAGE DATA IN THE IMAGE MEMORY RELATIVE TO AN OUTPUT MEDIUM

CROSS-REFERENCE TO RELATED APPLICATION

This patent application is based on and claims priority pursuant to 35 U.S.C. § 119(a) to Japanese Patent Application No. 2015-254837 filed on Dec. 25, 2015, in the Japan Patent Office, the entire disclosure of which is hereby incorporated by reference herein.

BACKGROUND

Technical Field

The present invention relates to an image processing device, an image forming apparatus, an image processing method, and a non-transitory recording medium.

Description of the Related Art

In an image formed by an image forming apparatus that forms images in units of a predetermined number of lines in a main scanning direction, lines of the image may deviate from the main scanning direction to be inclined or bent relative to the main scanning direction.

For example, in an electrophotographic image forming apparatus, a scanning line formed with laser light emitted onto a photoconductor (e.g., photoconductor drum) based on one line of image data may deviate from the axial direction of the photoconductor to be inclined or bent relative to the axial direction. Such a bend of the scanning line is caused by a factor such as a mechanical error related to the installation position of a laser light source or the photoconductor drum, for example.

A typical image forming apparatus measures the inclination and bend of the scanning line with an optical sensor, for example, corrects the image data (i.e., bitmap data) to cancel the measured inclination and bend of the scanning line, and forms an image based on the corrected bitmap data.

SUMMARY

In one embodiment of this invention, there is provided an improved image processing device that includes, for example, an external memory interface and an inclination correction circuit. The external memory interface writes image data to an image memory. The inclination correction circuit generates coordinate information based on inclination information. The coordinate information includes a coordinate in a main scanning direction and a coordinate in a sub-scanning direction that together represent a position of each of pixels of the image data relative to an output medium onto which the image data is to be output. The inclination information represents an inclination of the image data in the image memory relative to the output medium. The inclination correction circuit detects, from the coordinate information, a minimum sub-scanning coordinate in each of a plurality of divided areas of the image data divided in the main scanning direction. The minimum sub-scanning coordinate has a minimum value in the each of the plurality of divided areas of the image data in the sub-scanning direction of the image data. The inclination correction circuit generates first read addresses for reading the plurality of divided areas of the image data from the image memory based on the detected minimum sub-scanning coordinate in the each of the plurality of divided areas of the image data. The inclination correction circuit reads the plurality of divided areas of the image data from the image memory based on the first read addresses, and writes the plurality of divided areas of the image data to an internal memory. The inclination correction circuit generates second read addresses for reading the plurality of divided areas of the image data from the internal memory based on the coordinate information, and reads the plurality of divided areas of the image data from the internal memory based on the second read addresses.

In one embodiment of this invention, there is provided an improved image forming apparatus that includes, for example, an image reading device, the above-described image processing device, and an image output device. The image reading device reads a document to generate image data of the document. The image processing device performs image processing on the image data. The image output device forms and outputs an image on an output medium based on the image data subjected to the image processing.

In one embodiment of this invention, there is provided an improved image processing method that includes, for example: writing image data to an image memory; generating coordinate information based on inclination information, the coordinate information including a coordinate in a main scanning direction and a coordinate in a sub-scanning direction that together represent a position of each of pixels of the image data relative to an output medium onto which the image data is to be output, and the inclination information representing an inclination of the image data in the image memory relative to the output medium; detecting, from the coordinate information, a minimum sub-scanning coordinate in each of a plurality of divided areas of the image data divided in the main scanning direction, the minimum sub-scanning coordinate having a minimum value in the each of the plurality of divided areas of the image data in the sub-scanning direction of the image data; generating first read addresses for reading the plurality of divided areas of the image data from the image memory based on the detected minimum sub-scanning coordinate in the each of the plurality of divided areas of the image data; reading the plurality of divided areas of the image data from the image memory based on the first read addresses; writing the plurality of divided areas of the image data to an internal memory; generating second read addresses for reading the plurality of divided areas of the image data from the internal memory based on the coordinate information; and reading the plurality of divided areas of the image data from the internal memory based on the second read addresses.

In one embodiment of this invention, there is provided a non-transitory recording medium storing a program for causing a computer to execute the above-described image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
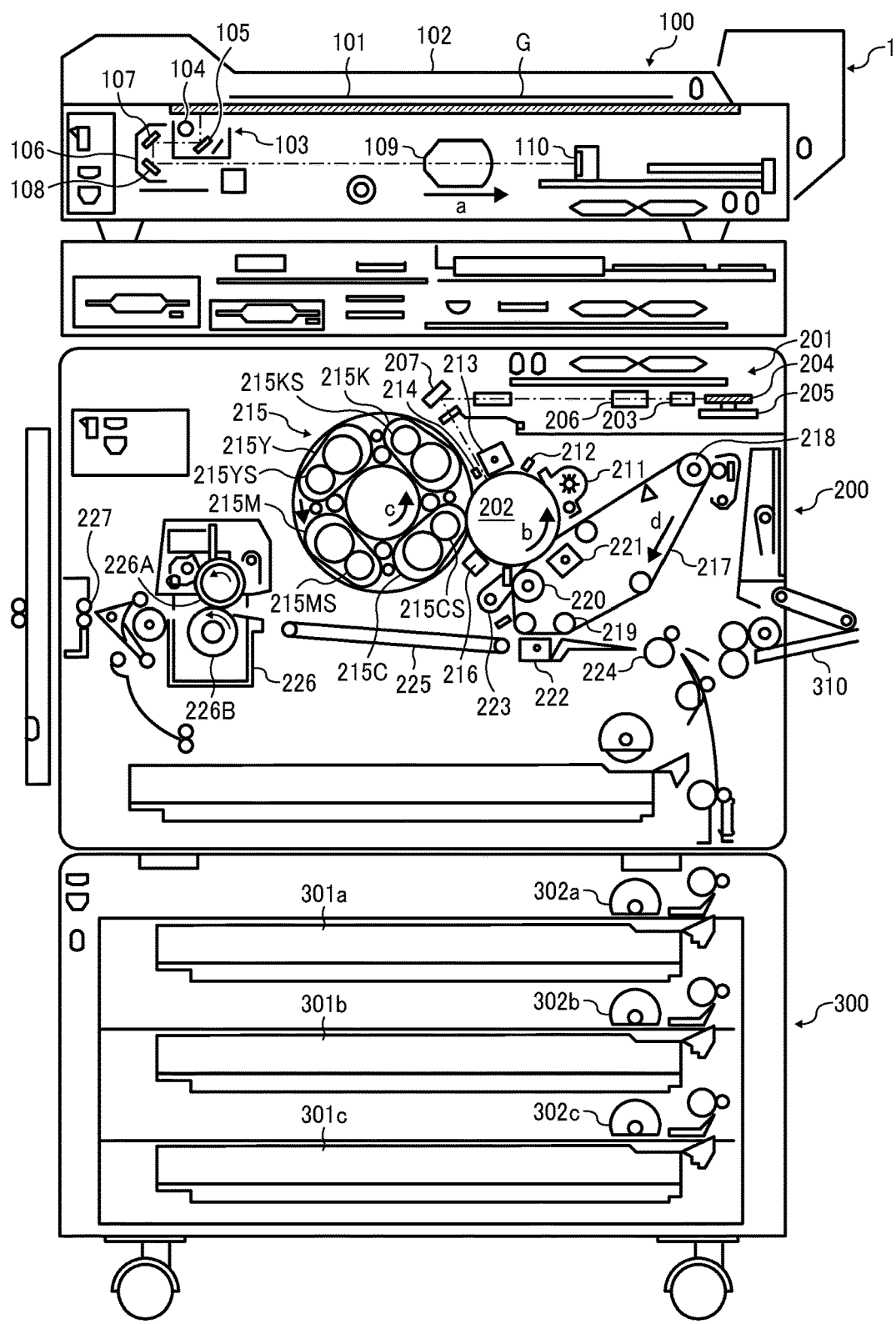
FIG. 1 is a diagram illustrating a configuration of a multifunction peripheral according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In an image formed by a typical image forming apparatus, a scanning line may be inclined or bent relative to a main scanning direction. To correct image data of the image to cancel the inclination and bend of the scanning line, the image forming apparatus uses line buffers to perform an interpolation process using pixels around a bend portion of the scanning line. The capacity of the line buffers used in the interpolation process replies on the width of the bend of the scanning line. For example, if the width of the bend of the scanning line corresponds to N lines of the image data (i.e., bitmap data), the capacity of the line buffers used in this case corresponds to the N lines of the bitmap data. Since the width of the bend of the scanning line, i.e., the number N of the lines, varies among image forming apparatuses, the line buffers mounted in an image forming apparatus is desired to have a capacity exceeding the maximum variation value of the number N. Consequently, the capacity of the line buffers is increased, resulting in an increase in size of a circuit for correcting the bend of the scanning line and thus an increase in overall cost.

Referring now to the accompanying drawings, wherein like reference numerals designate identical or corresponding parts throughout the several views, embodiments of the present invention will be described in detail. The following embodiments of the present invention may include various technically favorable limitations. The following description, however, should not unduly limit the scope of the present invention. Further, not all configurations described in the embodiments are required components of the present invention.

FIG. 1 to FIG. 16C are drawings for describing an image processing device, an image forming apparatus, an image processing method, and a non-transitory recording medium according to an embodiment of the present invention. FIG. 1 is a diagram illustrating a configuration of a multifunction peripheral 1 as an image forming apparatus according to the present embodiment.

In FIG. 1, the multifunction peripheral 1 serving as an image forming apparatus includes a scanner 100, a printer 200, and a sheet feeding unit 300.

In the scanner 100, which serves as an image reading device, a document G is placed on a contact glass 101 and pressed by a pressure plate 102. The document G is then irradiated with light from an illuminating lamp 104, which is a light source of a first carriage 103 disposed below the contact glass 101. The light is reflected by the document G and then sequentially by a mirror 105 of the first carriage 103 and mirrors 107 and 108 of a second carriage 106 to be incident on a 3-line charge coupled device (CCD) sensor 110 through a lens 109. The 3-line CCD sensor 110 photoelectrically converts the incident light to the image of the document G. In the reading of the image of the document G, the first carriage 103 and the second carriage 106 move in a sub-scanning direction while scanning the document G in the main scanning direction, to thereby scan the document G both in the main scanning direction and the sub-scanning direction, and the 3-line CCD sensor 110 divides the image into images of red (R), green (G), and blue (B) colors to obtain R, G, and B color component image signals.

Based on the intensity levels of the R, G, and B color component image signals obtained by the scanner 100, the multifunction peripheral 1 performs a color conversion process with an image processing unit to convert the image of the document G into color image data including information of recording colors: black (K), cyan (C), magenta (M), and yellow (Y).

Based on the color image data, the printer 200, which serves as an image output device, forms and superimposes K, C, M, and Y images on a photoconductive drum 202, which are transferred on an intermediate transfer belt 217. The full-color image having the K, C, M, and Y images superimposed one above the other is then transferred onto a transfer sheet, which serves as an output medium, and the transfer sheet having the image formed thereon is output.

Specifically, in response to a start signal, the scanner 100 moves the first carriage 103 and the second carriage 106 to the right in FIG. 1, as indicated by arrow a, to scan the image of the document G. In each scanning operation, the scanner 100 acquires the image data of one color and transmits the image data of the color to the printer 200. The printer 200 sequentially forms and superimposes visible images of the four colors on the intermediate transfer belt 217, to thereby form a full-color image with the four colors.

In the printer 200, an optical writing unit 201 converts the color image data from the scanner 100 into optical signals and performs optical writing in accordance with the image of the document G, to thereby form electrostatic latent images on a photoconductor drum 202.

The optical writing unit 201 includes a laser light emitter 203, a light emitter drive controller for driving the laser light emitter 203, a polygon mirror 204, a rotating motor 205 for driving the polygon mirror 204 to rotate, an fθ lens 206, and a reflecting mirror 207, for example. In the optical writing unit 201, the light emitter drive controller controls light emission of the laser light emitter 203 based on the color image data to emit modulated laser light to the polygon mirror 204. The polygon mirror 204 is driven to rotate by the rotating motor 205 to direct the incident laser light to a surface of the photoconductor drum 202 via lenses and mirrors such as the fθ lens 206 and the reflecting mirror 207 to scan the surface of the photoconductor drum 202 with the laser light. Thereby, the electrostatic latent images are formed on the surface of the photoconductor drum 202.

The photoconductor drum 202 is driven to rotate counterclockwise, as indicated by arrow b. The photoconductor drum 202 is surrounded by a photoconductor cleaning unit 211, a discharging lamp 212, a charger 213, a potential sensor 214, a revolver developing device 215 (specifically, a selected one of developing devices 215K, 215C, 215M, and 215Y in the revolver developing device 215), a development density pattern detector 216, and the intermediate transfer belt 217.

The potential sensor 214 detects the electrostatic potential on the surface of the photoconductor drum 202.

The revolver developing device 215 includes the developing devices 215K, 215C, 215M, and 215Y for the K, C, M, and Y colors (hereinafter referred to as K, C, M, and Y developing devices 215K, 215C, 215M, and 215Y), and a revolver rotation driving unit for rotating the K, C, M, and Y developing devices 215K, 215C, 215M, and 215Y counterclockwise, as indicated by arrow c. Each of the K, C, M, and Y developing devices 215K, 215C, 215M, and 215Y includes a corresponding one of developing sleeves 215KS, 215CS, 215MS, and 215YS and a developing paddle. The developing sleeves 215KS, 215CS, 215MS, and 215YS rotate while bringing spikes of developer into contact with the surface of the photoconductor drum 202 to render the electrostatic latent images visible. The developing paddles rotate to scoop and stir the developer.

The revolver developing device 215 in a standby state is set to a position for performing development with the K developing device 215K. When a copying operation starts, the scanner 100 starts reading black image data at a predetermined time, and the optical writing to the surface of the photoconductor drum 202 with the laser light starts based on the black image data. With the optical writing, the electrostatic latent image based on the black image data (hereinafter referred to as the K latent image) starts to be formed. The optical writing and the electrostatic latent image formation are similarly performed based on cyan image data, magenta image data, and yellow image data, to thereby form the electrostatic latent images based on the cyan image data, the magenta image data, and the yellow image data, respectively (hereinafter referred to as the C, M, and Y latent images). In the revolver developing device 215, to start developing the K latent image from a leading end portion thereof, the developing sleeve 215KS starts to be rotated before the leading end portion of the K latent image reaches the development position of the K developing device 215K, to thereby develop the K latent image with black toner. The K latent image continues to be developed, and after a trailing end portion of the K latent image passes the development position of the K developing device 215K, the revolver developing device 215 is swiftly driven to rotate from the development position of the K developing device 215K to the development position of the C developing device 215C (i.e., the developing device for the next color). This operation of rotating the revolver developing device 215 is completed at least before a leading end portion of the next C latent image based on the cyan image data reaches the development position of the C developing device 215C.

When an image formation cycle starts, the printer 200 rotates the photoconductor drum 202 counterclockwise, as indicated by arrow b in FIG. 1, and rotates the intermediate transfer belt 217 clockwise, as indicated by arrow d in FIG. 1, with a drive motor. With the rotation of the intermediate transfer belt 217, the printer 200 sequentially forms a black toner image, a cyan toner image, a magenta toner image, and a yellow toner image (hereinafter referred to as the K, C, M, and Y toner images) and superimposes the K, C, M, and Y toner images on the intermediate transfer belt 217 in this order, to thereby form the full-color toner image.

The printer 200 first forms the K toner image as follows. The charger 213 uniformly charges the surface of the photoconductor drum 202 to approximately −700 V with negative charge by corona discharge. Then, the laser light emitter 203 performs the above-described optical writing with the laser light (i.e., raster exposure) based on a black image signal. With this raster exposure, exposed portions of the uniformly charged surface of the photoconductor drum 202 lose charge in proportion to the amount of the laser light (i.e., exposure light), to thereby form the electrostatic latent image, i.e., the K latent image.

The black toner in the K developing device 215K of the revolver developing device 215 is stirred with ferrite carrier to be charged to the negative polarity. The developing sleeve 215KS of the K developing device 215K is applied with a voltage by a power supply circuit. The voltage has a negative direct-current (DC) potential superimposed with an alternating-current (AC) potential. Thereby, the developing sleeve 215KS is electrically biased relative to a metal base layer of the photoconductor drum 202. Therefore, the black toner does not adhere to still charged portions of the surface of the photoconductor drum 202 but is attracted by the discharged, exposed portions of the surface of the photoconductor drum 202, thereby forming the K toner image (i.e., K visible image) corresponding to the K latent image.

The intermediate transfer belt 217 is stretched around a drive roller 218, a transfer facing roller 219, a cleaning facing roller 220, and driven rollers, and is driven to rotate by a drive motor.

Then, a belt-transfer unit 221, which includes a corona discharger, for example, belt-transfers the K toner image formed on the photoconductor drum 202 onto a surface of the intermediate transfer belt 217, which is driven to rotate at a constant speed while in contact with the photoconductor drum 202.

After the belt-transfer, the photoconductor cleaning unit 211 cleans and collects a slight amount of untransferred toner remaining on the surface of the photoconductor drum 202 in preparation for the next use of the photoconductor drum 202, and stores the collected toner in a waste toner tank via a collecting pipe.

The K, C, M, and Y toner images sequentially formed on the photoconductor drum 202 are sequentially positioned and transferred onto the same surface of the intermediate transfer belt 217, to thereby form a belt-transferred, four-color superimposed toner image. Thereafter, a sheet-transfer unit 222, which includes a corona discharger, for example, transfers the K, C, M, and Y toner images onto the transfer sheet at one time.

On the photoconductor drum 202, the cyan image forming process is performed subsequently to the black image forming process. Specifically, the scanner 100 starts reading cyan image data at a predetermined time, and the printer 200 performs the optical writing with the laser light based on the cyan image data, to thereby form the C latent image on the surface of the photoconductor drum 202. The printer 200 drives the revolver developing device 215 to rotate after the trailing end portion of the K latent image passes the development position of the K developing device 215K and before the leading end portion of the C latent image reaches the development position of the C developing device 215C. The printer 200 then develops the C latent image with cyan toner. After a trailing end portion of the C latent image passes the development position of the C developing device 215C, the printer 200 drives the revolver developing device 215 to move the C developing device 215C forward similarly as in the above-described operation of moving the K developing device 215K forward. Thereby, the printer 200 positions the next M developing device 215M to the development position thereof before a leading end portion of the M latent image reaches the development position. The magenta image forming process and the yellow image forming process are similar to the black image forming process and the cyan image forming process described above in the image data reading, the latent image formation, and the image developing operation, and thus description thereof will be omitted.

The intermediate transfer belt 217 is cleaned by a belt cleaning device 223, which includes an entrance seal, a rubber blade, a discharge coil, and a contact-separation mechanism that causes the entrance seal and the rubber blade to contact and separate from the intermediate transfer belt 217. With the contact-separation mechanism, the belt cleaning device 223 keeps the entrance seal and the rubber blade separated from the surface of the intermediate transfer belt 217 during the belt-transfer of the C, M, and Y toner images (i.e., the toner images of the second to fourth colors) following the belt-transfer of the K toner image (i.e., the toner image of the first color).

The sheet-transfer unit 222 applies an AC-DC component or a DC component to the transfer sheet and the intermediate transfer belt 217 by corona discharge, to thereby cause the full-color toner image formed of the superimposed toner images on the intermediate transfer belt 217 to be transferred onto the transfer sheet.

The sheet feeding unit 300 stores a plurality of transfer sheet cassettes 301a, 301b, and 301c to store transfer sheets of different sizes. The sheet feeding unit 300 feeds and conveys a transfer sheet of a specified size from one of the transfer sheet cassettes 301a, 301b, and 301c storing the transfer sheet toward a registration roller pair 224 of the printer 200 with a corresponding one of sheet feeding rollers 302a, 302b, and 302c.

The multifunction peripheral 1 also includes a manual sheet feeding tray 310 provided to a side surface of the printer 200 to store sheets such as overhead projector (OHP) sheets or thick sheets.

When starting the image formation, the multifunction peripheral 1 feeds a transfer sheet from one of the transfer sheet cassettes 301a, 301b, and 301c or the manual sheet feeding tray 310, and causes the transfer sheet to stop and stand by at a nip portion formed between rollers of the registration roller pair 224. The multifunction peripheral 1 then drives the registration roller pair 224 to feed the transfer sheet such that a leading end portion of the transfer sheet meets a leading end portion of the toner image on the intermediate transfer belt 217 when the leading end portion of the toner image reaches the sheet-transfer unit 222. Thereby, the toner image and the transfer sheet are properly positioned relative to each other. When the transfer sheet passes over the sheet-transfer unit 222, which is connected to a positive potential, the four-color superimposed toner image on the intermediate transfer belt 217 is superimposed on the transfer sheet. In this process, the transfer sheet is charged with positive charge by a corona discharge current. Thereby, most of the toner image is transferred onto the transfer sheet. The transfer sheet then passes a sheet separating and discharging unit including a discharging brush, which is provided on the left side of the sheet-transfer unit 222 in FIG. 1. Thereby, the transfer sheet is discharged and separated from the intermediate transfer belt 217, and is moved to a sheet conveyance belt 225. The sheet conveyance belt 225 conveys the transfer sheet to a fixing unit 226. In the fixing unit 226, the superimposed toner images of the four colors transferred to the transfer sheet at one time from the surface of the intermediate transfer belt 217 are fused and fixed on the transfer sheet at a nip portion formed between a fixing roller 226A and a pressure roller 226B controlled to a predetermined temperature. The transfer sheet having the toner images fixed thereon is discharged to the outside of the multifunction peripheral 1 by a discharge roller pair 227 to be placed face-up on a copy tray.

After the belt-transfer of the toner images to the intermediate transfer belt 217 from the photoconductor drum 202, the photoconductor cleaning unit 211, which includes components such as a brush roller and a rubber blade, cleans the surface of the photoconductor drum 202, and the discharging lamp 212 uniformly discharges the surface of the photoconductor drum 202. Further, after the sheet-transfer of the toner images to the transfer sheet from the intermediate transfer belt 217, the belt cleaning device 223 again cleans the surface of the intermediate transfer belt 217 by pressing the rubber blade against the surface of the intermediate transfer belt 217 with the contact-separation mechanism.

In the case of a repeat copy job of making a plurality copies of a single original document, the multifunction peripheral 1 performs the operation of the scanner 100 and the image formation onto the photoconductor drum 202 by proceeding, at a predetermined time, from the process of forming the image of the four color for the first page to the process of forming the image of the first color for the second page. In the process of forming the image of the first color for the second page, the multifunction peripheral 1 belt-transfers the K toner image for the second page onto an area of the surface of the intermediate transfer belt 217 cleaned by the belt cleaning device 223 after the superimposed toner images of the four colors for the first page are transferred at one time onto the transfer sheet from the intermediate transfer belt 217. Thereafter, the multifunction peripheral 1 performs an operation similar to the operation performed for the first page.

Figure 2:
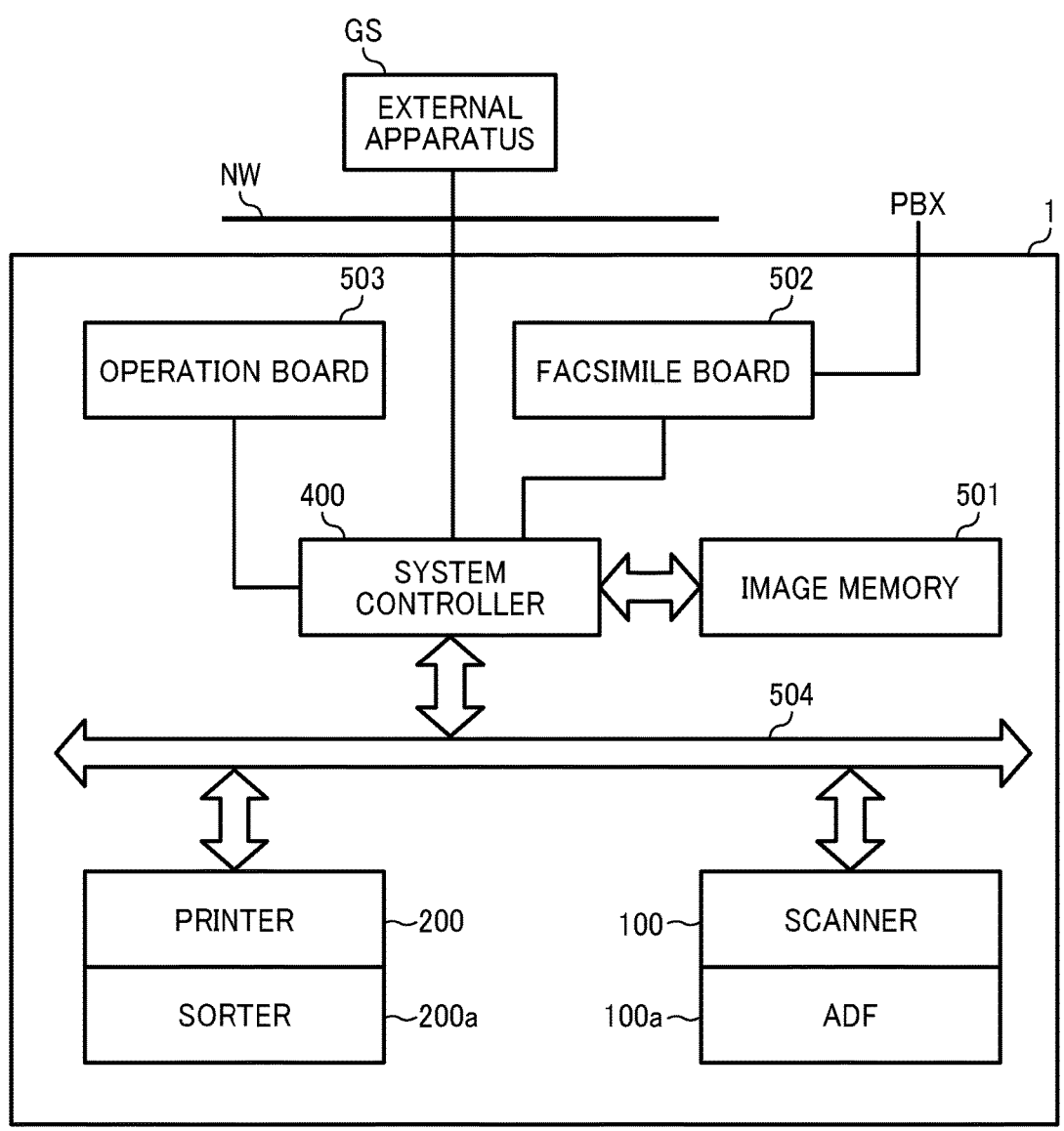
FIG. 2 is a block diagram illustrating a circuit configuration of the multifunction peripheral illustrated in FIG. 1.

As illustrated in FIG. 2, the multifunction peripheral 1 is provided with a print instruction command and print data (i.e., image data) by an external host apparatus (hereinafter referred to as the external apparatus) GS such as a personal computer via a network NW such as a local area network (LAN) or a parallel interface (I/F), for example. Provided with the print data, the multifunction peripheral 1 prints out (i.e., outputs the image of) the print data with the printer 200. The multifunction peripheral 1 further transmits the image data of the document G read by the scanner 100 to a facsimile machine at a remote site, and prints out image data received from the facsimile machine. The multifunction peripheral 1 is connected to a public telephone network via a private branch exchange (PBX) to perform facsimile communication or communication with an administration server of a service center via the public telephone network. The multifunction peripheral 1 of the present embodiment is a digital full-color copier with multiple functions including the above-described functions.

A circuit configuration of the multifunction peripheral 1 is illustrated as blocks in FIG. 2. In addition to the scanner 100 and the printer 200 described above, the multifunction peripheral 1 includes a system controller 400, an image memory 501, a facsimile board 502, an operation board 503, a sorter 200*a*, and an automatic document feeder (ADF) 100*a*. The system controller 400 is connected to the image memory 501. The system controller 400, the scanner 100, and the printer 200 are connected by a peripheral component interconnect (PCI) bus 504.

The system controller 400 is connected to the external apparatus GS such as a computer via the network NW such as a LAN. The system controller 400 exchanges image data and commands with the external apparatus GS via the network NW, and operates based on image data and commands received from the external apparatus GS.

The operation board 503 includes a variety of operation keys and a display, and is connected to the system controller 400. The operation board 503 outputs operations performed with the operation keys to the system controller 400, and outputs and displays data from the system controller 400 on the display.

The sorter 200*a* is installed to the printer 200. When the printer 200 prints a plurality of copies, the sorter 200*a* sorts and places printed sheets by copies.

The ADF 100*a* is installed to the scanner 100. A plurality of documents are placed on the ADF 100*a*, and the ADF 100*a* feeds the placed documents one by one to the scanner 100.

The facsimile board 502 is connected to the system controller 400, and is also connected to the public telephone network via the PBX to transmit and receive facsimile data via the public telephone network.

The image memory 501 is connected to the system controller 400. Under control of the system controller 400, the image memory 501 stores the image data received from the external apparatus GS and the image data read by the scanner 100. Further, under control of the system controller 400, the image data stored in the image memory 501 is read to be used in the image formation by the printer 200, the facsimile transmission by the facsimile board 502, or the data transfer via the network NW.

For example, the multifunction peripheral 1 executes a job by storing the image data read by the scanner 100 in the image memory 501 and using the stored image data later or by outputting the image data to the printer 200 without storing the image data in the image memory 501.

The multifunction peripheral 1 stores the image data in the image memory 501 when printing a plurality of copies of the single document G, for example. In this case, the multifunction peripheral 1 operates the scanner 100 once to read the image data, stores the read image data in the image memory 501, and prints the copies with the printer 200 by reading the stored image data from the image memory 501 multiple times.

The multifunction peripheral 1 does not store the image data in the image memory 501 when printing a single copy of the single document G, for example. In this case, the multifunction peripheral 1 directly outputs the image data read by the scanner 100 to the printer 200 without writing the image data to the image memory 501.

Further, the multifunction peripheral 1 may store the image data in the image memory 501 and perform an additional process, such as rotation of an image or synthesis of images, for example, when reading the image data from the image memory 501. In this case, the system controller 400 of the multifunction peripheral 1 performs access control of the image memory 501, deployment (e.g., character code/character bit conversion) of the print data from the external apparatus GS, and compression and decompression of image data for effective use of the image memory 501. The multifunction peripheral 1 transmits the image data to the image memory 501, compresses and stores the transmitted image data in the image memory 501, and reads the stored image data as necessary. The multifunction peripheral 1 decompresses the read image data in the image memory 501 to restore the original image data.

With the above-described flow of image data, the multifunction peripheral 1 performs data transfer through the PCI bus 504 under bus control of the system controller 400, to thereby achieve the multiple functions.

In the present embodiment, if the input image data has a steep inclination, the multifunction peripheral 1 uses a later-described internal memory 415 in FIG. 6 included in the system controller 400 to temporarily store the image data to correct the inclination.

Figure 3:
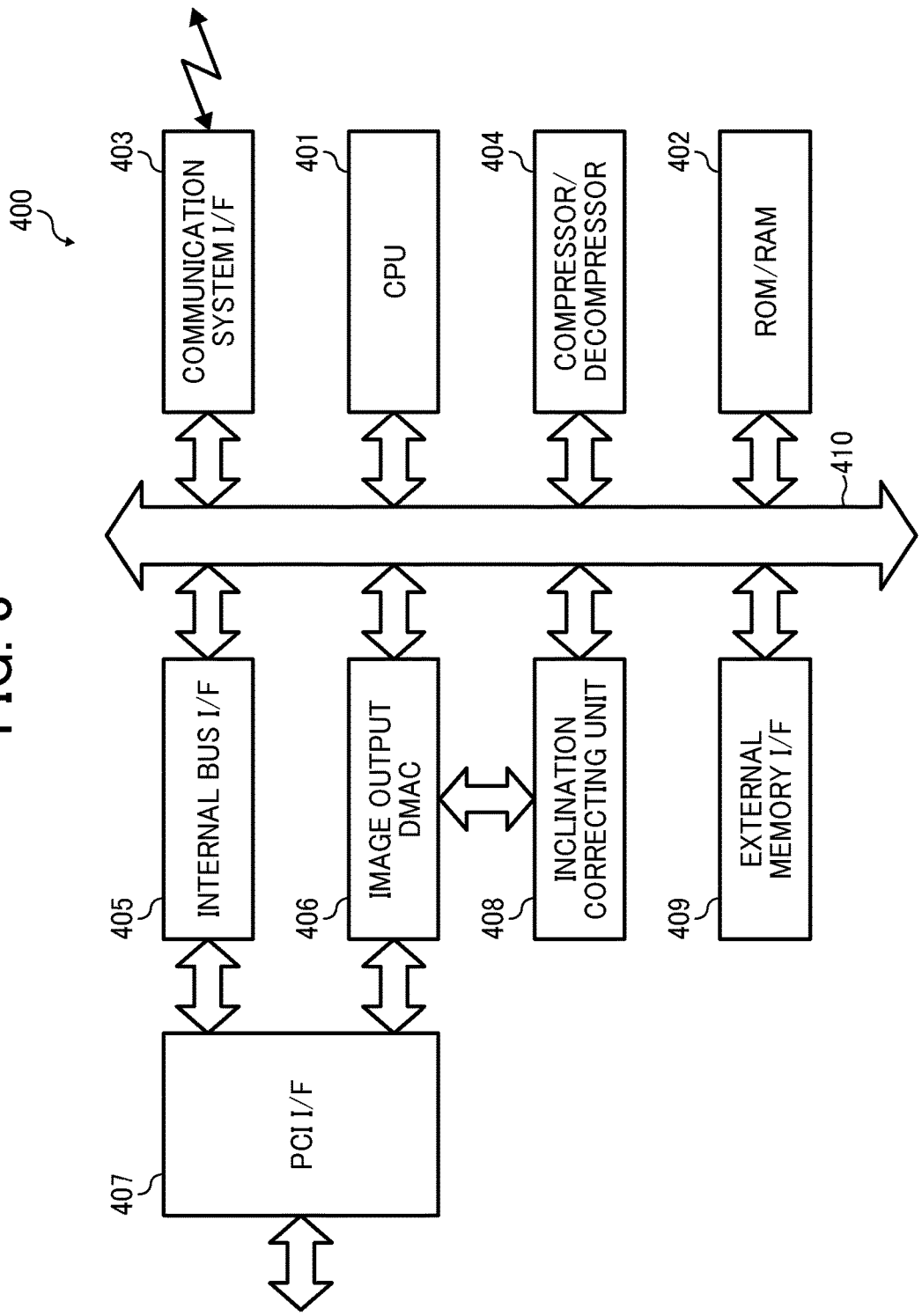
FIG. 3 is a block diagram illustrating a configuration of a system controller of the multifunction peripheral.

As illustrated in FIG. 3, the system controller 400 includes a central processing unit (CPU) 401, a read-only memory/random access memory (ROM/RAM) 402, a communication system I/F 403, a compressor/decompressor 404, an internal bus I/F 405, an image output direct memory access controller (DMA controller or DMAC) 406, a PCI I/F 407, an inclination correcting unit 408, and an external memory I/F 409, which are connected by an internal bus 410.

The CPU 401 executes a variety of arithmetic processes, and controls all settings of the multifunction peripheral 1 and the activation of the image output DMAC 406, the compressor/decompressor 404, and the inclination correcting unit 408. Further, the CPU 401 writes the image data received from the external apparatus GS to the image memory 501 as printable rendering data via the external memory I/F 409 based on a printer language. The external memory I/F 409 therefore functions as a data writing device that writes image data to the image memory 501.

The external memory I/F 409 is connected to the internal bus 410 and the image memory 501 to exchange data between the image memory 501 and the system controller 400 under control of the CPU 401.

The ROM/RAM 402 includes a ROM to store a basic program of the multifunction peripheral 1, system data, a program for executing the image processing method according to the present embodiment, and data for use in executing the image processing method according to the present embodiment. The ROM/RAM 402 further includes a RAM to be used as a work memory of the CPU 401 and for deployment of one page of rendering data to be printed by the printer 200, for example.

The communication system I/F 403 is an interface between the external apparatus GS, the operation board 503, the facsimile board 502, and the system controller 400 to transmit and receive data to and from the CPU 401 via the image memory 501 or an internal register.

The PCI I/F 407 is connected to the PCI bus 504 to exchange data with a PCI bus master in accordance with the protocol of the PCI bus 504.

The internal bus I/F 405 is an interface between the PCI I/F 407 and the internal bus 410 to perform data input to or data output from the image memory 501 via the external memory I/F 409 in response to specification of an address and data by the PCI bus master.

Figure 4:
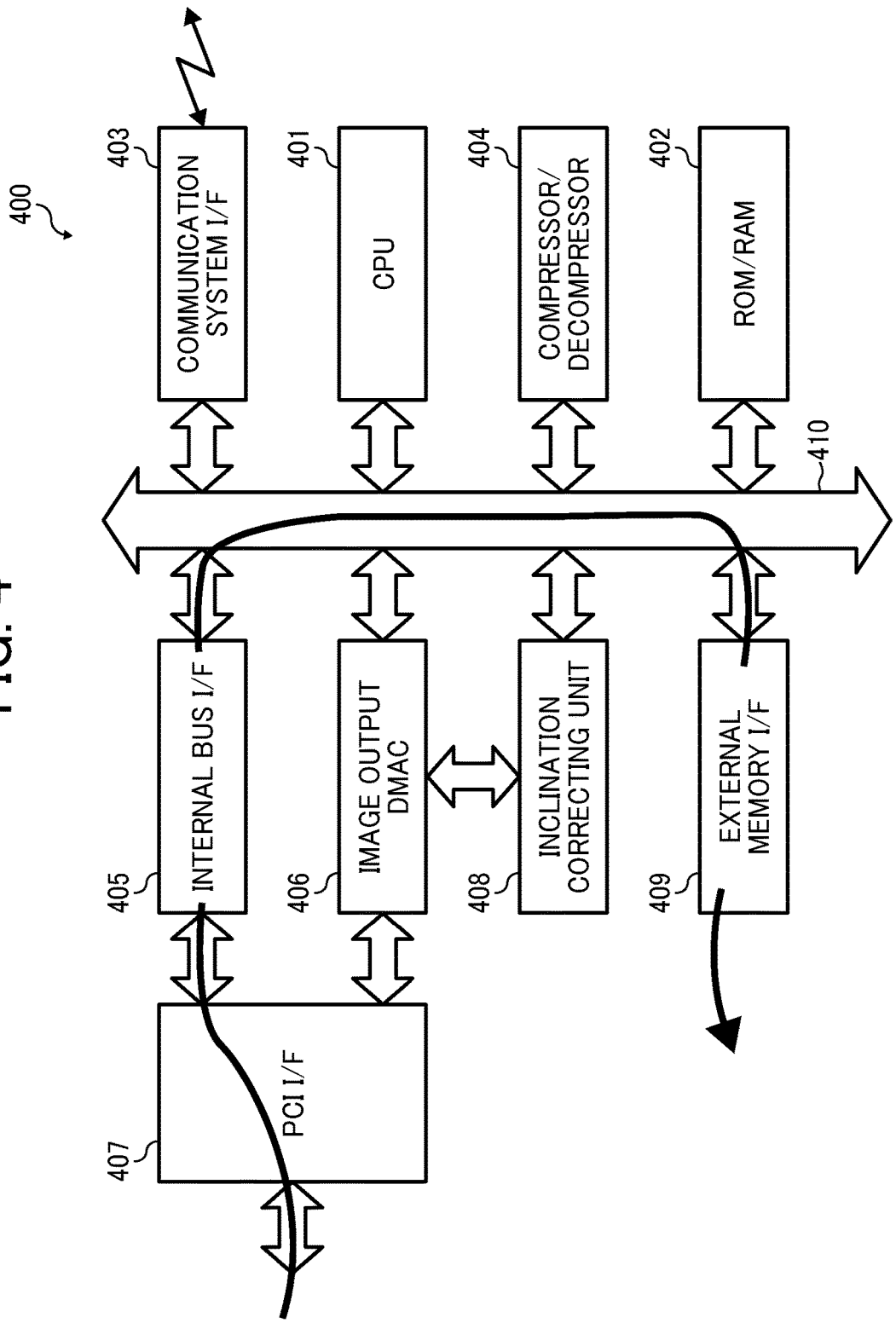
FIG. 4 is a diagram illustrating a transfer path of image data from a scanner of the multifunction peripheral.

As indicated by a thick solid arrow in FIG. 4, the system controller 400 writes the image data read by the scanner 100 to the image memory 501 via the PCI I/F 407, the internal bus I/F 405, the internal bus 410, and the external memory I/F 409.

The image output DMAC 406 is connected to the internal bus 410 and the PCI I/F 407, and functions as a DMA controller in the printing operation. That is, the image output DMAC 406 is activated by the CPU 401 to read image data from a previously specified area in the image memory 501 and output the image data by handshaking with the PCI I/F 407 as appropriate. The PCI bus master of the PCI bus 504 normally directly accesses the image memory 501 connected thereto via the internal bus I/F 405 of the system controller 400. In this case, however, the PCI bus master accesses a predetermined address in a memory space of the image memory 501 predetermined by PCI configuration settings. When reading and transferring image data from the image memory 501 to the printer 200, therefore, the system controller 400 transfers the image data via the external memory I/F 409, the internal bus 410, the image output DMAC 406, and the PCI I/F 407, as indicated by a thick solid arrow in FIG. 5. Thereby, a read response time of the PCI bus 504 for outputting the image data is reduced.

The compressor/decompressor 404 is activated and controlled by the CPU 401 to compress and decompress a variety of data to reduce the data capacity of the image memory 501.

The inclination correcting unit 408 (i.e., an inclination correction circuit) operates under control of the CPU 401 to correct the inclination of the image data, particularly the inclination of the image data read by the scanner 100. When the multifunction peripheral 1 conveys the document G to the scanner 100 with the ADF 100a, an inclination (i.e., positional distortion) occurs in the document G read by the scanner 100, depending on the mechanical precision of related components. If the multifunction peripheral 1 causes the printer 200 to print the image data of the document G read by the scanner 100 without correcting the inclination, therefore, the image data is printed as rotated by a slight angle in accordance with the inclination of the document G.

The multifunction peripheral 1, therefore, detects a skew (i.e., an angle of inclination) of the document G conveyed to a document reading position of the scanner 100 by using a skew sensor, and the inclination correcting unit 408 performs image processing on the image data of the document G based on the detected skew to correct the inclination.

Figure 5:
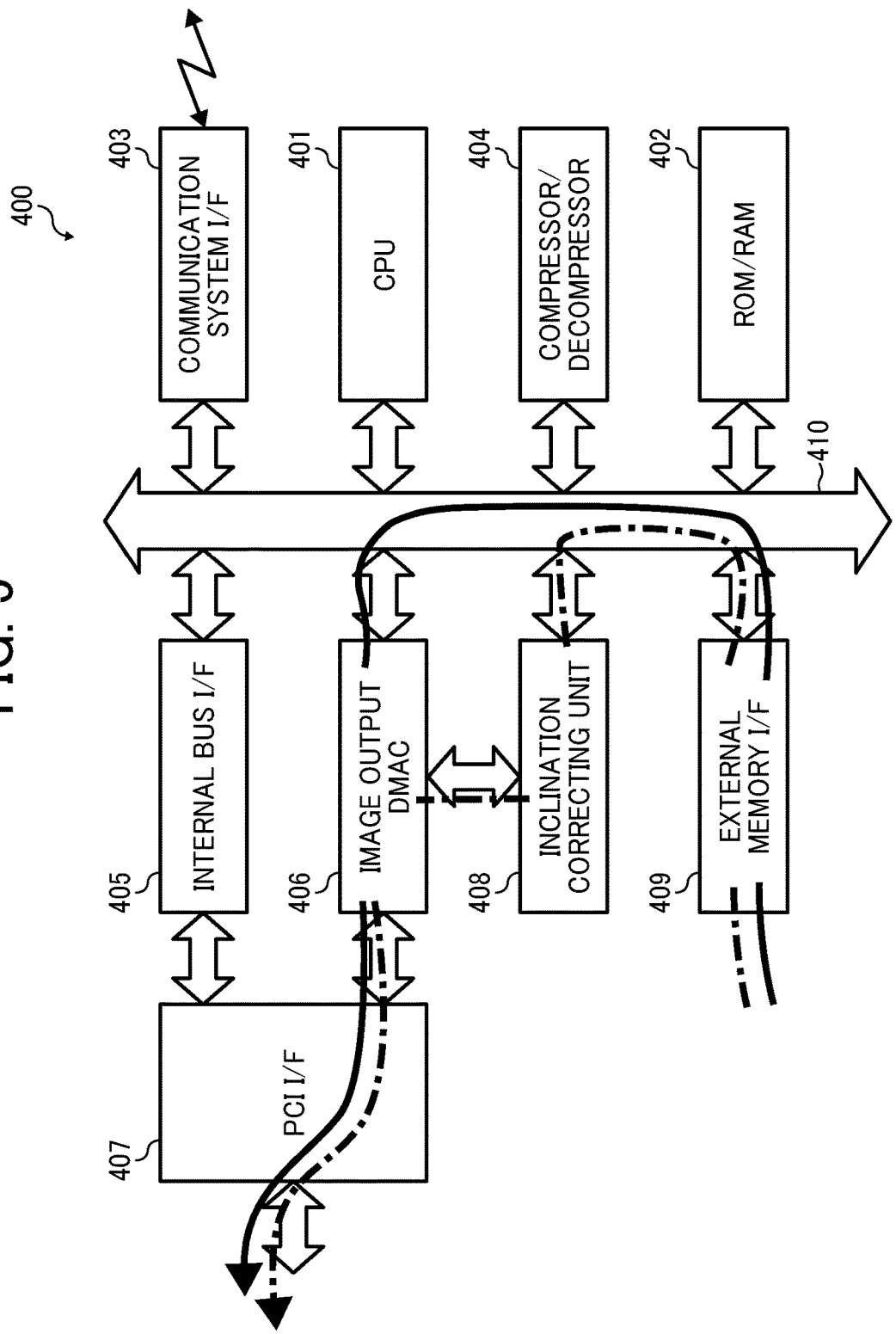
FIG. 5 is a diagram illustrating a transfer path of image data read from an image memory of the multifunction peripheral.
Figure 6:
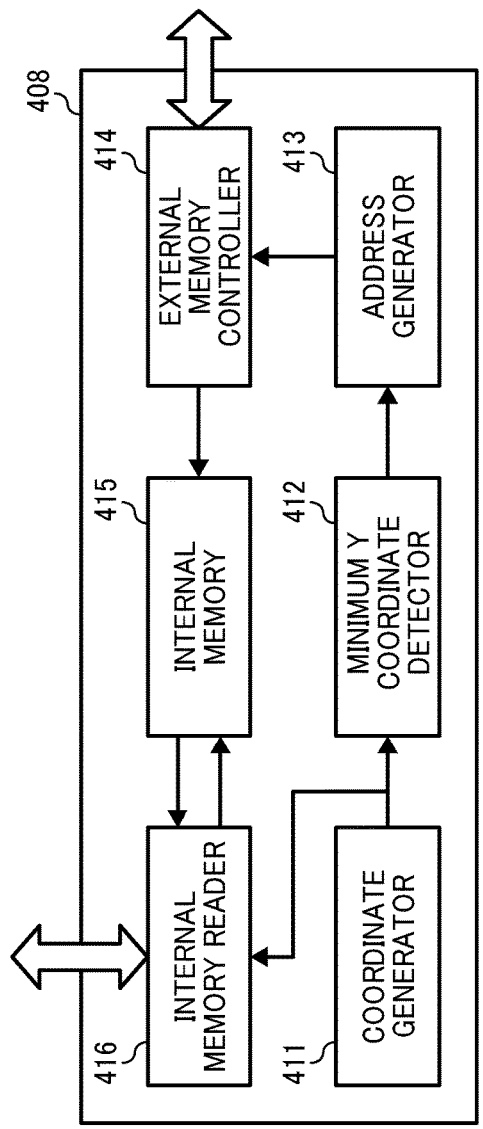
FIG. 6 is a block diagram illustrating a configuration of an inclination correcting unit of the system controller.

Specifically, the inclination correcting unit 408 temporarily stores the image data of the document G read by the scanner 100 in the image memory 501, reads the image data from the image memory 501 with memory addresses obtained by addressing for correcting the inclination, and captures the thus-read image data in the internal memory 415 in FIG. 6. The inclination correcting unit 408 further reads and transmits the thus-captured image data from the internal memory 415 to the printer 200 to print the image data. When the inclination correcting unit 408 corrects the inclination of the image data, the system controller 400 transfers the image data to the printer 200 via the external memory I/F 409, the internal bus 410, the inclination correcting unit 408, the image output DMAC 406, and the PCI I/F 407, as indicated by a dash-dotted arrow in FIG. 5. Thereby, the image data is transferred to the printer 200 with the inclination thereof corrected. The multifunction peripheral 1 determines whether to transfer the image data through the transfer path indicated by the solid arrow in FIG. 5 or through the transfer path indicated by the dash-dotted arrow in FIG. 5 in accordance with whether an inclination correcting function is turned on or off with an inclination correction key of the operation board 503, for example.

The inclination correcting unit 408 has a configuration illustrated as blocks in FIG. 6. The inclination correcting unit 408 and the external memory I/F 409 cooperate to form an image processing device. As illustrated in FIG. 6, the inclination correcting unit 408 includes a coordinate generator 411, a minimum Y coordinate detector 412, an address generator 413, an external memory controller 414, the internal memory 415, and an internal memory reader 416.

The coordinate generator 411 generates a line synchronization signal, and generates coordinate information based on inclination information. The coordinate information includes a coordinate in the main scanning direction and a coordinate in the sub-scanning direction that together specify the position of each of output pixels of the image data. The inclination information represents the inclination in the main scanning direction of the image data relative to the sub-scanning direction. Herein, the image data is of the document G scanned in the main scanning direction and the sub-scanning direction by the scanner 100. The inclination information representing the inclination of the image data corresponds to the inclination (i.e., skew) detected by the skew sensor that detects the inclination (i.e., skew) of the document G conveyed to the document reading position of the scanner 100. The coordinate information is two-dimensional coordinates (X, Y) of each of the pixels of the input image data, and indicates the reading position for accurately reading the pixel in the main scanning direction in consideration of the inclination of the input image data. The coordinate generator 411 therefore functions as a coordinate generating device. The coordinate generator 411 outputs the generated coordinate information to the minimum Y coordinate detector 412 and the internal memory reader 416.

The minimum Y coordinate detector 412 detects, from the Y coordinates generated by the coordinate generator 411, a minimum Y coordinate value (i.e., minimum Y coordinate) in each of divided areas of the image data, and outputs the detected minimum Y coordinate to the address generator 413. The minimum Y coordinate detector 412 therefore functions as a minimum sub-scanning coordinate detector.

Based on the minimum Y coordinate detected by the minimum Y coordinate detector 412, the address generator 413 generates read addresses (i.e., memory addresses) for reading the image data from the image memory 501 as an external memory. The address generator 413 therefore functions as a read address generating device. The number of the read addresses equals the number of the divided areas of the image data divided in the main scanning direction. For example, if the image data is divided into 16 areas in the main scanning direction, the number of the read addresses is 16.

Based on the read addresses generated by the address generator 413, the external memory controller 414 accesses the image memory 501 as an external memory, reads the image data from the image memory 501, and writes the read image data to the internal memory 415. The external memory controller 414 therefore functions as a data transfer device.

The internal memory 415 is formed of static random access memories (SRAMs) corresponding to a plurality of lines, and temporarily stores the image data read from the image memory 501 by the external memory controller 414. The internal memory 415 further outputs the image data in accordance with the reading operation by the internal memory reader 416. That is, the internal memory 415 temporarily stores the image data read from the image memory 501 by the external memory controller 414, and the temporarily stored image data is read by the internal memory reader 416. The internal memory 415 therefore functions as a temporary memory.

The internal memory reader 416 generates addresses of the image data in the internal memory 415 based on the coordinate information from the coordinate generator 411, reads the image data from the internal memory 415 with a predetermined interpolation process performed on the image data, and outputs the read image data to the outside of the inclination correcting unit 408. The internal memory reader 416 therefore functions as a data reading device.

The multifunction peripheral 1 of the present embodiment is configured as an image forming apparatus that reads, from a computer-readable recording medium, the program for executing the image processing method according to the present embodiment, and installs the program to the ROM/RAM 402, for example. The computer-readable recording medium may be a ROM, an electrically erasable and programmable ROM (EEPROM), an erasable and programmable ROM (EPROM), a flash memory, a flexible disk, a compact disc-ROM (CD-ROM), a CD-rewritable (CD-RW), a digital versatile disk (DVD), a universal serial bus (USB) memory, a secure digital (SD) card, or a magneto-optical (MO) disc, for example. The program for executing the image processing method according to the present embodiment is a computer-executable program described in a legacy programming language or an object-oriented programming language, such as assembler, C, C++, C#, or Java (registered trademark), and may be distributed as stored in the above-described recording medium.

With the execution of the program, the external memory I/F 409 and the inclination correcting unit 408 are realized which cooperate to form the image processing device of the image forming apparatus to execute the image processing method according to the present embodiment. When outputting the stored image data from the image memory 501 via the internal memory 415 while correcting the inclination of the image data, the image processing method according to the present embodiment reads the image data from the image memory 501 by equally dividing the image data into a plurality of divided areas in the main scanning direction. Accordingly, the configuration of a circuit for generating the read addresses is simplified, and a reduction in cost is achieved.

Operations of the present embodiment will now be described.

In the multifunction peripheral 1 of the present embodiment, when the inclination correcting unit 408 outputs the stored image data from the image memory 501 via the internal memory 415 while correcting the inclination of the image data, the inclination correcting unit 408 reads the image data from the image memory 501 by equally dividing the image data into the plurality of divided areas in the main scanning direction, as described above. Thereby, the circuit for generating the read addresses is simply configured, resulting in a reduction in cost.

In the multifunction peripheral 1, the system controller 400 writes to the image memory 501 the image data of the document G read by the scanner 100 or the image data received via the network NW. In this case, the system controller 400 writes the image data to the image memory 501 via the PCI I/F 407, the internal bus I/F 405, the internal bus 410, and the external memory I/F 409, as indicated by the thick solid arrow in FIG. 4.

Figure 7C:
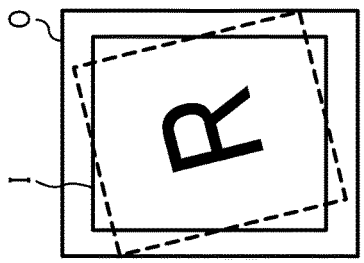
FIGS. 7A to 7D are diagrams illustrating a correction process of correcting image data of an inclined document.
Figure 7B:
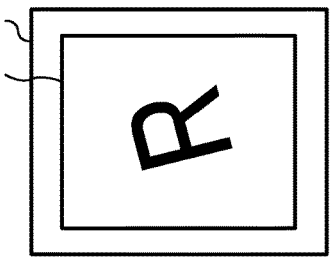
Figure 7D:
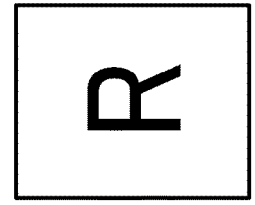
Figure 7A:
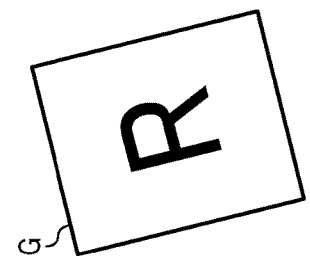

If the input image data is inclined, like the image data read by the scanner 100 or the external apparatus GS from the document G inclined as illustrated in FIG. 7A, the image data is written to the image memory 501 with the inclination, as illustrated in FIG. 7B.

When the multifunction peripheral 1 of the present embodiment reads the image data from the image memory 501 and outputs the image data to the printer 200 or the external apparatus GS, therefore, the inclination correcting unit 408 reads and outputs the image data from the image memory 501, as indicated by the dash-dotted line in FIG. 5. In this process, the multifunction peripheral 1 corrects the inclination of the image data.

Figure 8A:
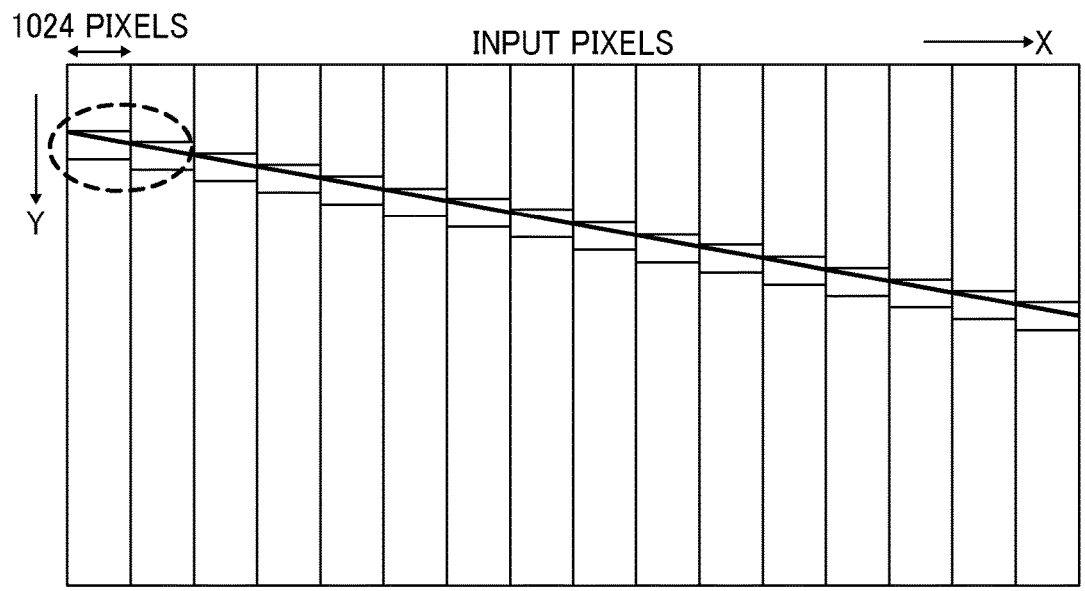
FIGS. 8A and 8B are diagrams illustrating an example of image data inclined downward to the right in a main scanning direction.
Figure 8B:
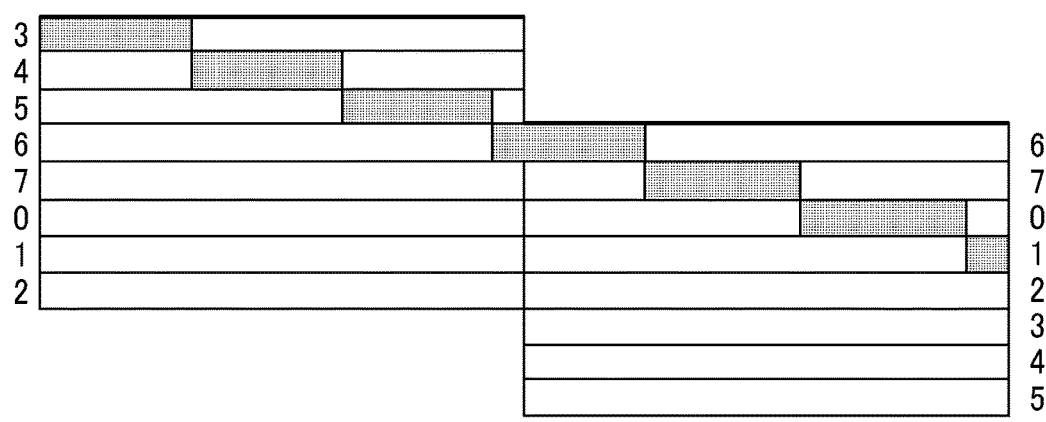
Figure 9:
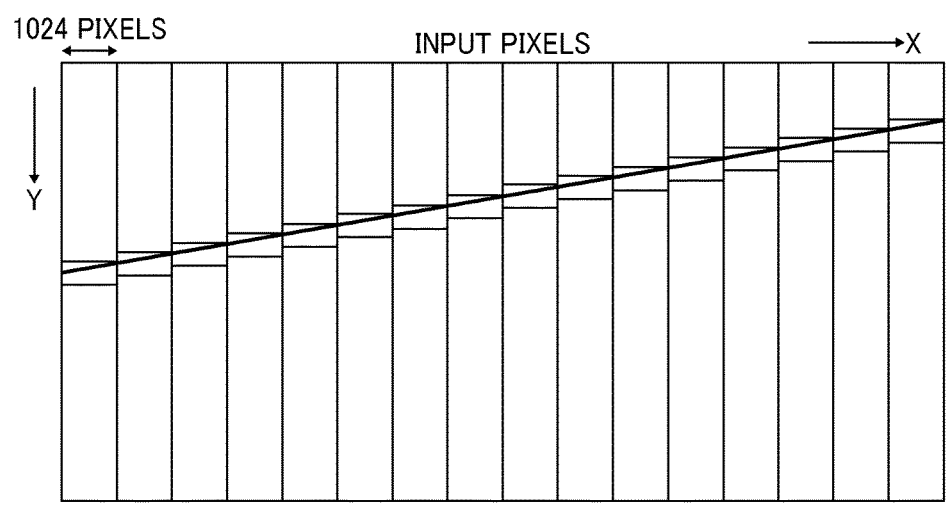
FIG. 9 is a diagram illustrating an example of image data inclined upward to the right in the main scanning direction.

The image data may be inclined downward to the right in the main scanning direction, as illustrated in FIG. 8A, or may be inclined upward to the right in the main scanning direction, as illustrated in FIG. 9. The inclination correcting unit 408 equally divides the image data into n areas in the main scanning direction (i.e., the X direction in FIGS. 8A and 9), and detects the minimum Y coordinate (i.e., minimum sub-scanning coordinate) in each of the n equally divided areas. Specifically, the coordinate generator 411 generates the coordinates (X, Y) of each of the pixels of the image data. In pixel values of image data represented by a straight diagonal line in FIG. 8A or 9, the minimum Y coordinate detector 412 detects the minimum Y value (i.e., minimum Y coordinate value) in the X direction in each of the divided areas of the image data divided in the sub-scanning direction (i.e., the Y direction in FIGS. 8A and 9). FIG. 8B is an enlarged view of a part encircled by a broken line in FIG. 8A. In FIG. 8B, hatched portions represent the image data, and each of thick straight lines indicates the position of the minimum Y coordinate.

The address generator 413 then calculates the read addresses based on the minimum Y coordinate value in each of the divided areas, and outputs the calculated read addresses to the external memory controller 414. The number of the read addresses equals the number of the divided areas, as described above. In the multifunction peripheral 1 of the present embodiment, the image data is equally divided into the 16 divided areas (i.e., n=16) in the X direction, and thus the number of the read addresses is 16. It is assumed here that the image data of the present embodiment has a resolution of 1200 dots per inch (dpi) and includes 1024 pixels in each of the divided areas of the image data, i.e., 16384 pixels in each of lines of the image data. The internal memory 415 has a memory capacity corresponding to eight lines of the image data, for example, and addresses in the internal memory 415 are specified and used in a ring format.

Based on the generated addresses, the external memory controller 414 reads the stored inclined image data from the image memory 501 with the inclination corrected, as indicated by a broken line in FIG. 7C, and temporarily stores the inclination-corrected image data in the internal memory 415, as illustrated in FIG. 7D.

The internal memory reader 416 reads the inclination-corrected image data from the internal memory 415 based on the coordinates (X, Y) generated by the coordinate generator 411, and outputs the image data to the image output DMAC 406, as illustrated in FIG. 5. The system controller 400 outputs the image data to the printer 200 or the external apparatus GS via the PCI I/F 407.

Figure 10:
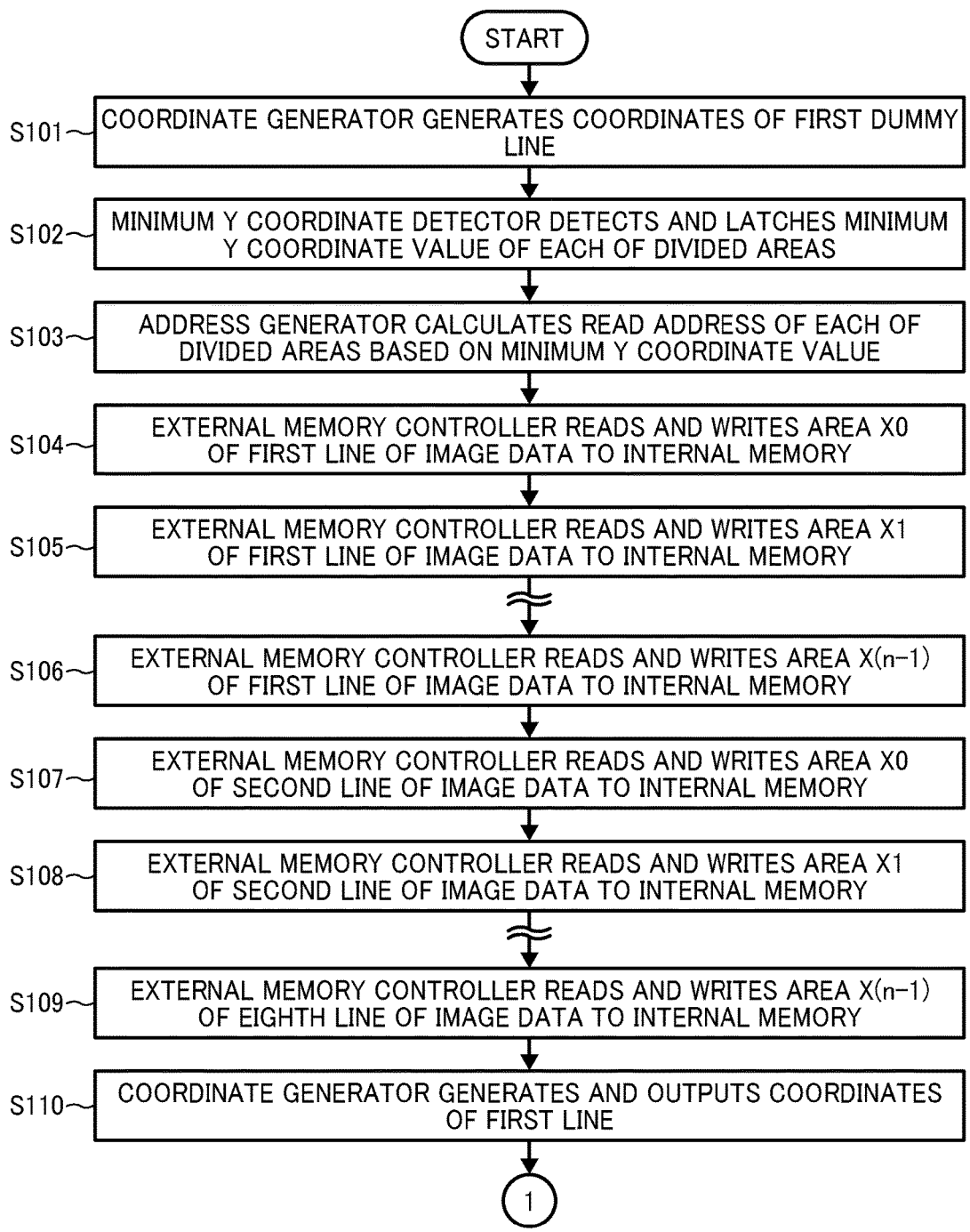
FIGS. 10 and 11 are a flowchart illustrating an inclination correction process.

As illustrated in the flowchart of FIG. 10, the coordinate generator 411 of the inclination correcting unit 408 first generates the coordinates of the first line as a dummy line to detect the minimum Y coordinate (step S101). As described above, the coordinate generator 411 calculates the coordinates based on the inclination detected by the skew sensor, for example, i.e., the inclination of the document G read by the scanner 100. The coordinate generator 411 obtains coordinates of the input image corresponding to the reading positions of the output pixels.

The minimum Y coordinate detector 412 of the inclination correcting unit 408 then detects and latches the minimum Y coordinate value of each of the divided areas, and outputs the minimum Y coordinate to the address generator 413 (step S102).

The address generator 413 calculates the read addresses for reading the image data from the image memory 501 based on the minimum Y coordinate value of each of the divided areas, and outputs the calculated read addresses to the external memory controller 414 (step S103). As described above, the number of the read addresses equals the number n of the divided areas. In the present example, the image data has the 16 divided areas (i.e., n=16), and thus the number of the read addresses is 16.

The external memory controller 414 then accesses the image memory 501 and reads the image data therefrom based on the read addresses generated by the address generator 413, and writes the read image data to the internal memory 415. The external memory controller 414 first reads the first divided area X0 of the first line of the image data, and writes the divided area X0 to the internal memory 415 (step S104).

The external memory controller 414 similarly reads the second divided area X1 of the first line of the image data, and writes the divided area X1 to the internal memory 415 (step S105). The external memory controller 414 repeats the above-described process, and reads the n-th divided area X(n−1) of the first line of the image data, and writes the divided area X(n−1) to the internal memory 415 (step S106).

After reading and writing the last divided area of the first line of the image data, the external memory controller 414 reads the first divided area X0 of the second line of the image data from the image memory 501, and writes the divided area X0 to the internal memory 415 (step S107).

The external memory controller 414 similarly performs a process of reading each of the divided areas of the second line of the image data from the image memory 501 and writing each of the divided areas to the internal memory 415 (step S108). The external memory controller 414 sequentially reads and writes the subsequent divided areas of the image data. When the external memory controller 414 completes reading the last divided area X(n−1) of the eighth line of the image data and writing the divided area X(n−1) to the internal memory 415 (step S109), all areas in the internal memory 415 are written with image data.

Figure 12:
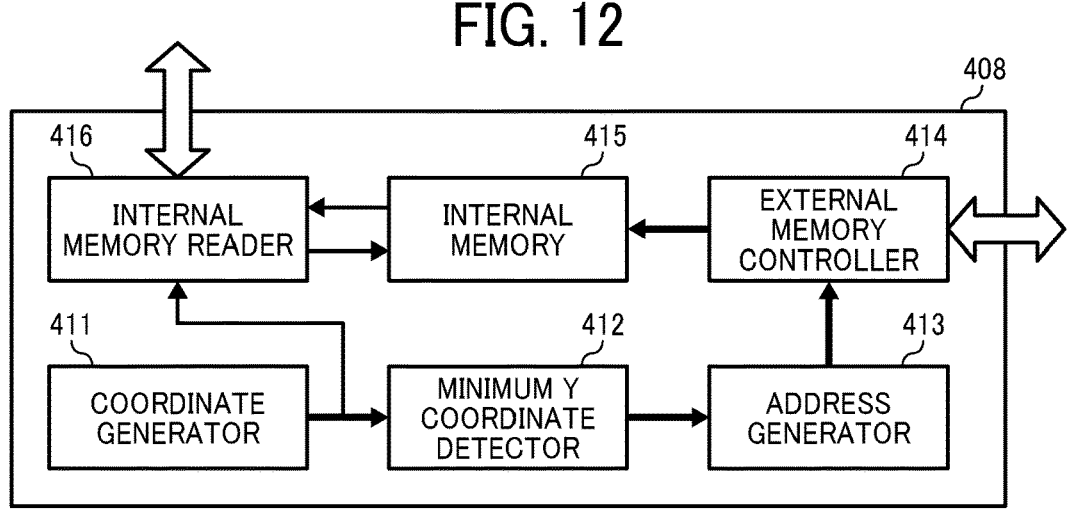
FIG. 12 is a diagram illustrating an operation of writing image data from the image memory to SRAMs of an internal memory in the inclination correcting unit.
Figure 13:
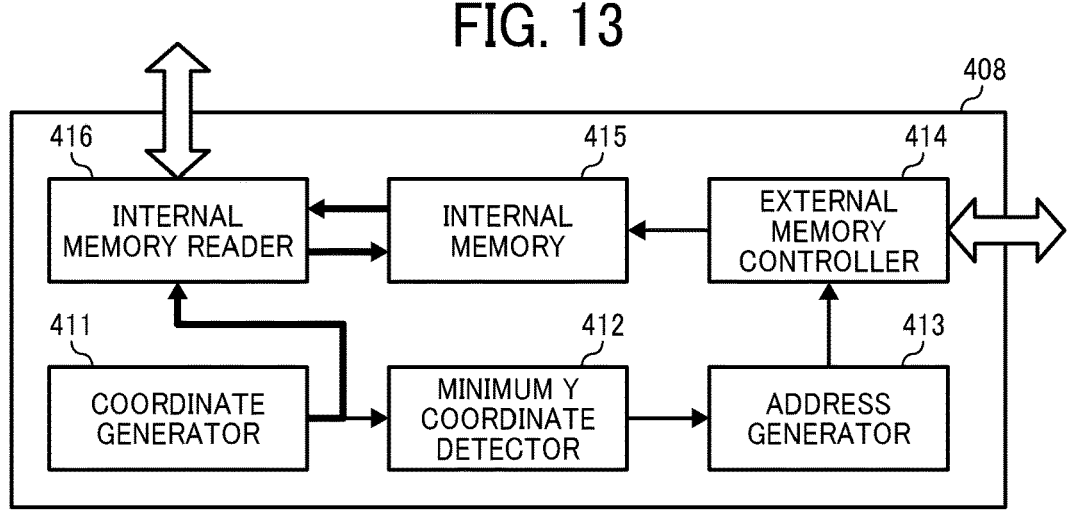
FIG. 13 is a diagram illustrating an operation of reading and outputting image data from the SRAMs.

The inclination correcting unit 408 performs the above-described process through a path indicated by thick arrows in FIG. 12 to read the image data from the image memory 105 with the inclination of the image data corrected and write the inclination-corrected image data to the internal memory 415.

Figure 11:
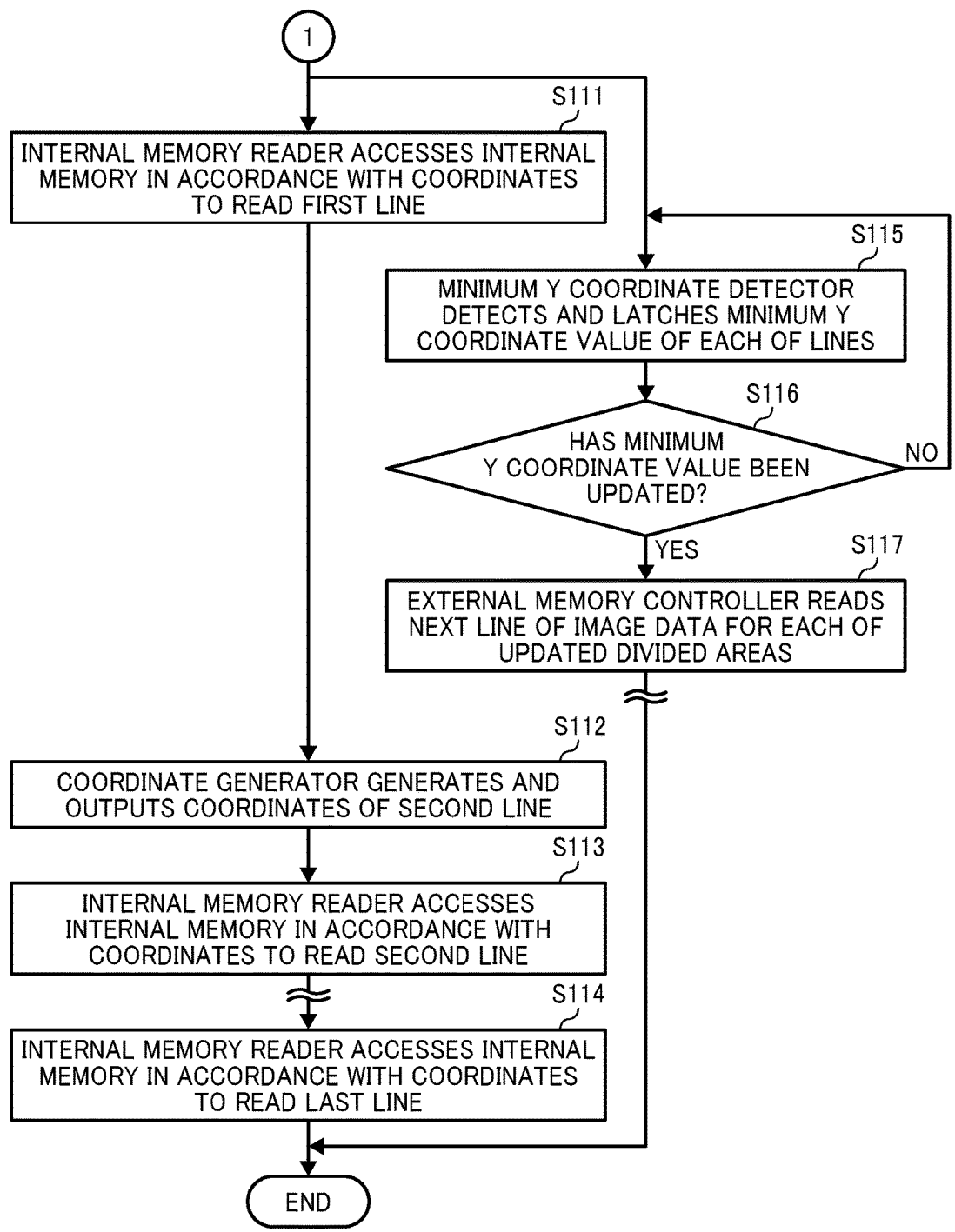

The internal memory reader 416 of the inclination correcting unit 408 then acquires the coordinates of the first line of the image data generated and output by the coordinate generator 411 (step S110). Then, as illustrated in the flowchart of FIG. 11, the internal memory reader 416 reads and outputs the first line of the image data from the internal memory 415 in accordance with the coordinates (step S111). In this case, the internal memory reader 416 selects a divided area from the n divided areas in accordance with high-order digits of the X coordinate of the coordinates (X, Y) output by the coordinate generator 411, and selects an effective line from m lines based on low-order bits of the Y coordinate of the coordinates (X, Y). The coordinate information and the addresses used in writing the image data to the image memory 501 have a relationship expressed by a specific conversion equation. The internal memory reader 416 uses the high-order digits of the X coordinate in the main scanning direction as the upper address in the internal memory 415, and changes the address for each of the divided areas, to thereby assign the addresses for the m lines in the internal memory 415. Herein, the m lines correspond to the line capacity of the internal memory 415, and are eight lines in the present embodiment.

In a similar manner, the coordinate generator 411 generates the coordinates (X, Y) of the second line of the image data (step S112), and the internal memory reader 416 reads the second line of the image data from the internal memory 415 based on the generated coordinates (X, Y) (step S113). When the internal memory reader 416 completes reading the last line of the image data from the internal memory 415, the inclination correction process is completed (step S114). The image data subjected to this process is output as the inclination-corrected image data, as illustrated in FIG. 7D. The inclination correcting unit 408 performs the above-described process through paths indicated by thick arrows in FIG. 13 to read the inclination-corrected image data from the internal memory 415 and output the image data to the printer 200 or the external apparatus GS.

When the coordinate generator 411 generates the coordinates of the first line of the image data, the inclination correcting unit 408 performs an operation of updating the image data stored in the internal memory 415 at steps S115 to S117 separately from the above-described operation of outputting the image data.

Specifically, the minimum Y coordinate detector 412 detects the minimum value of the Y coordinates output by the coordinate generator 411 (i.e., the minimum Y coordinate value) in each of the lines, and holds (i.e., latches) the detected minimum Y coordinate value (step S115).

The address generator 413 checks if the minimum Y coordinate value held by the minimum Y coordinate detector 412 has been updated (step S116). If the minimum Y coordinate value has been updated (YES at step S116), the address generator 413 updates the addresses and outputs the updated addresses to the external memory controller 414. For each of updated divided areas, the external memory controller 414 reads the next line of the image data from the image memory 501, and writes the read line to the internal memory 415 (step S117). As described above, the internal memory 415 has the m lines (eight lines in the present embodiment) used in the ring format. If the minimum Y coordinate value has been updated, therefore, the external memory controller 414 reads from the image memory 501 the line of the image data most distant from the current minimum Y coordinate value, and writes the read line to the internal memory 415.

Figure 14:
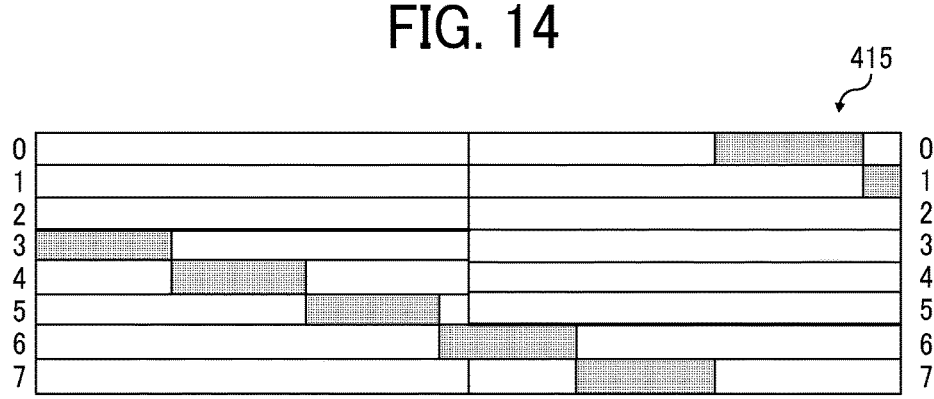
FIG. 14 is a diagram illustrating an example of image data stored in the SRAMs.

For example, in the internal memory 415 having the memory capacity of the m lines (i.e., eight lines in the present embodiment), the image data in FIG. 8B (i.e., the image data encircled by the broken line in FIG. 8A) is stored, as illustrated in FIG. 14. The divided areas of the image data are sequentially updated and stored. In FIG. 14, hatched portions represent the image data, and each of thick straight lines indicates the position of the minimum Y coordinate. That is, even if the internal memory 415 does not have the n divided areas and has the memory capacity of the m lines, the image data in the internal memory 415 are appropriately addressed and read from the internal memory 415. Accordingly, the circuit size of the internal memory 415 is reduced, thereby achieving a reduction in cost.

As described above, when storing the input image data in the image memory 501 and outputting the image data therefrom via the internal memory 415 while correcting the inclination of the image data, the inclination correcting unit 408 reads the image data from the image memory 501 by equally dividing the image data into the n divided areas (i.e., n=16) in the main scanning direction. Consequently, the configuration of the circuit for generating the read addresses is simplified, resulting in a reduction in cost of the inclination correcting unit 408 and thus a reduction in cost of the multifunction peripheral 1.

If the inclined document G is read by the scanner 100, and if the above-described inclination correction is performed on the image data of the inclined document G in a memory area having the same size as the size of image data in the main scanning direction and the sub-scanning direction, data other than the actually read image data is added to the output image.

Specifically, as illustrated in FIGS. 7B and 7C, a memory area O of the image memory 501 for storing the read image data is set to be slightly larger than an image data area I of the read image data in consideration of the inclination correction. In the reading of the image data from the image memory 501, the area surrounded by a broken line in FIG. 7C is read, and thus data in the area between the memory area O and the image data area I is also read. As described above, however, the image data actually written to the image memory 501 is inside the image data area I surrounded by a solid line in FIG. 7C. Thus, the data outside the solid line of the image data area I and inside the broken line in FIG. 7C is already present in the image memory 501.

Figure 15:
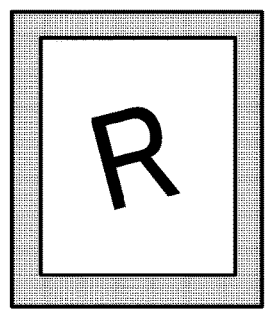
FIG. 15 is a diagram illustrating arrangement of blank data in the image memory.

To prevent the data already present in the image memory 501 from being added to the output image as noise data, therefore, the multifunction peripheral 1 of the present embodiment writes blank data (i.e., data with no image) in the area between the entire memory area O of the image memory 501 and the image data area I of the read image data, as indicated by hatching in FIG. 15. This area written with the blank data will hereinafter be referred to as the correction area. The width of the correction area is determined based on the difference between the width of the entire memory area O of the image memory 501 and the width of the image data area I of the read image data.

In the multifunction peripheral 1, the CPU 401 writes the blank data to the image memory 501 the image data is written to the image memory 501. Accordingly, the output image subjected to the inclination correction is prevented from being mixed with a noise image, and the image quality of the output image data is improved.

The foregoing description has focused on the inclined image data of the image of the document G read by the scanner 100. As described above, however, the description is similarly applicable to the image data input from the external apparatus GS, for example.

The inclination correction on the image data from the external apparatus GS is performed when the inclination is found in the input image data, or when the inclination is found not in the input image data but in the transfer sheet (i.e., output medium) onto which the image data is output. The inclination of the transfer sheet is caused by various factors, such as the mechanical precision of components forming a sheet conveyance path and the temperature inside the multifunction peripheral 1.

If the inclination is found in the input image data, and if the inclination information of the inclination is transmitted to the multifunction peripheral 1 from the external apparatus GS together with the image data, the multifunction peripheral 1 addresses the inclination by performing a process similar to the above-described process of correcting the inclination of the image data read by the scanner 100.

If the inclination is found not in the input image data but in the transfer sheet, on the other hand, the multifunction peripheral 1 outputs the image data as inclined in accordance with the inclination of the transfer sheet, to thereby output the image on the transfer sheet such that the image is not inclined relative to the transfer sheet.

Specifically, to print out the image with the printer 200 based on the image data received from the external apparatus GS, for example, the multifunction peripheral 1 converts the image data into bitmap data and stores the converted image data in the image memory 501. The multifunction peripheral 1 then detects the inclination of the transfer sheet (i.e., output medium) conveyed to the photoconductor drum 202 of the printer 200 with an inclination sensor disposed on the sheet conveyance path of the transfer sheet, and transmits the inclination information of the detected inclination to the inclination correcting unit 408.

Figure 16A:
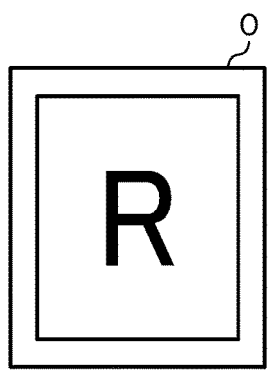
FIGS. 16A to 16C are diagrams illustrating correction of an inclination of image data according to an inclination of a transfer sheet.
Figure 16B:
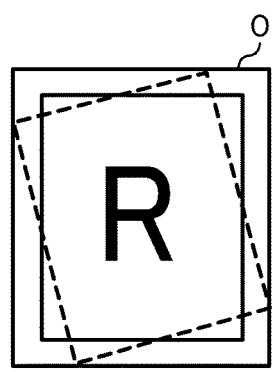
Figure 16C:
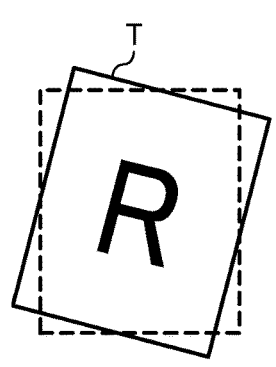

In this case, the inclination correcting unit 408 reads from the image memory 501 the image data stored therein, such as the image data illustrated in FIG. 16A, similarly as in the foregoing reading operation in accordance with the inclination information of the transfer sheet to cancel the inclination of the transfer sheet. If the transfer sheet is inclined downward to the right in this case, like a transfer sheet T indicated by a solid line in FIG. 16C, the inclination correcting unit 408 reads the image data from the image memory 501 with an inclination for cancelling the inclination of the transfer sheet, as indicated by a broken line in FIG. 16B. With the image data thus read from the image memory 501 with the inclination, the image is printed out on the transfer sheet with the inclination of the image relative to the transfer sheet corrected, as in the transfer sheet T in FIG. 16C.

When the transfer sheet (i.e., output medium) is inclined, therefore, the multifunction peripheral 1 outputs the image data as inclined in accordance with the inclination of the output medium while adjusting the read addresses at low cost, and thereby outputs the image in an appropriate direction at low cost.

As described above, the multifunction peripheral 1 of the present embodiment includes the external memory I/F 409 and the inclination correcting unit 408 (i.e., the inclination correction circuit), which cooperate to form an image processing device. The external memory I/F 409 writes the image data to the image memory 501. The inclination correcting unit 408 (i.e., the coordinate generator 411)

generates the coordinate information based on the inclination information. The coordinate information includes the coordinate in the main scanning direction (i.e., the X direction) and the coordinate in the sub-scanning direction (i.e., the Y direction) representing the position of each of the pixels of the image data relative to the transfer sheet (i.e., the output medium) onto which the image data is to be output. The inclination information represents the inclination of the image data in the image memory 501 relative to the output medium. The inclination correcting unit 408 (i.e., the minimum Y coordinate detector 412) further detects, from the coordinate information, the minimum sub-scanning coordinate in each of the plurality of divided areas of the image data divided in the main scanning direction. The minimum sub-scanning coordinate has a minimum value in the each of the plurality of divided areas in the sub-scanning direction of the image data. The inclination correcting unit 408 (i.e., the address generator 413) further generates the read addresses (i.e., first read addresses) for reading the plurality of divided areas of the image data from the image memory 501 based on the detected minimum sub-scanning coordinate in the each of the plurality of divided areas. The inclination correcting unit 408 (i.e., the external memory controller 414) further reads the plurality of divided areas of the image data from the image memory 501 based on the first read addresses, and writes the plurality of divided areas of the image data to the internal memory 415. The inclination correcting unit 408 (i.e., the internal memory reader 416) further generates the read addresses (i.e., second read addresses) for reading the plurality of divided areas of the image data from the internal memory 415 based on the coordinate information, and reads the plurality of divided areas of the image data from the internal memory 415 based on the second read addresses.

When outputting the stored image data from the image memory 501 via the internal memory 415 while correcting the inclination of the image data, therefore, the inclination correcting unit 408 reads the image data from the image memory 501 by equally dividing the image data into the plurality of divided areas in the main scanning direction. Accordingly, the circuit for generating the read addresses is simply configured, resulting in a reduction in cost.

Further, in the multifunction peripheral 1 of the present embodiment, the internal memory 415 has a storage area having a plurality of lines, and the inclination correcting unit 408 uses the plurality of lines of the storage area in a toggle manner to store the image data in the internal memory 415. When the inclination correcting unit 408 (i.e., the external memory controller 414) completes writing the image data to the last line of the plurality of lines of the internal memory 415, the inclination correcting unit 408 writes the image data to a line of the plurality of lines of the internal memory 415 written with the line of the image data most distant from the minimum Y coordinate (i.e., the minimum sub-scanning coordinate) currently selected.

Accordingly, the inclination correcting unit 408 corrects the inclination of the image data in the image memory 501 by effectively using the sub-capacity internal memory 415. Consequently, the configuration of the circuit for generating the read addresses in the correction of the image inclination is simplified, resulting in a further reduction in cost.

Further, in the multifunction peripheral 1 of the present embodiment, when generating each of the second read addresses, the inclination correcting unit 408 (i.e., the internal memory reader 416) generates a read address for selecting a divided area in the main scanning direction from the plurality of divided areas of the image data in accordance with high-order digits of the X coordinate (i.e., the coordinate in the main scanning direction) of the coordinate information, and generates an effective read address in the sub-scanning direction of the divided area from low-order bits of the Y coordinate (i.e., the coordinate in the sub-scanning direction).

Accordingly, the inclination correcting unit 408 corrects the inclination of the image data in the image memory 501 by effectively using the sub-capacity internal memory 415 with simple address specification. Consequently, the configuration of the circuit for generating the read addresses in the correction of the image inclination is simplified, resulting in a further reduction in cost.

Further, in the multifunction peripheral 1 of the present embodiment, the image memory 501 has a storage area including the memory area and the correction area. The memory area has a capacity of one page of the image data, and the correction area surrounds the memory area and has a predetermined width to store blank data.

When the inclined image data stored in the image memory 501 is read from the image memory 501, therefore, the image data is prevented from being mixed with noise. Accordingly, the image quality is improved.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing device comprising:
   an external memory interface to write image data to an image memory; and
   processing circuitry to
   generate coordinate information based on inclination information, the coordinate information including a coordinate in a main scanning direction and a coordinate in a sub-scanning direction for each of a plurality of pixels of the image data, representing a position of each of the respective pixels of the plurality of pixels of the image data relative to an output medium onto which the image data is to be output, and the inclination information representing an inclination of the image data in the image memory relative to the output medium,
   detect, from the coordinate information, a minimum sub-scanning coordinate in each of a plurality of divided areas of the image data divided in the main scanning direction, the minimum sub-scanning coordinate having a minimum value in the each of the plurality of divided areas of the image data in the sub-scanning direction of the image data,
   generate first read addresses for reading the plurality of divided areas of the image data from the image memory based on the minimum sub-scanning coordinate detected in the each of the plurality of divided areas of the image data, read the plurality of divided areas of the image data from the image memory based on the first read addresses, and write the plurality of divided areas of the image data to an internal memory, and generate second read addresses for reading the plurality of divided areas of the image data from the internal memory based on the coordinate information, and read the plurality of divided areas of the image data from the internal memory based on the second read addresses, such that the image data read from the image memory with an inclination is able to be output to the output medium with inclination of the image data relative to the output medium sheet corrected.

2. The image processing device of claim 1, wherein the internal memory includes a storage area including a plurality of lines, wherein the at least one processor is configured to use the plurality of lines of the storage area in a toggle manner to store the image data in the internal memory, and wherein upon the at least one processor completing writing the image data to a relatively last line of the plurality of lines of the internal memory, the at least one processor is configured to write the image data to a line of the plurality of lines of the internal memory written with a line of the image data relatively most distant from the minimum sub-scanning coordinate currently selected.

3. The image processing device of claim 1, wherein in generating each of the second read addresses, the at least one processor is configured to generate a read address for selecting a divided area in the main scanning direction from the plurality of divided areas of the image data in accordance with relatively high-order digits of the coordinate in the main scanning direction of the coordinate information, and generate an effective read address in the sub-scanning direction of the divided area from relatively low-order bits of the coordinate in the sub-scanning direction of the coordinate information.

4. The image processing device of claim 1, wherein the image memory includes a storage area including a memory area and a correction area, the memory area including a capacity of one page of the image data, and the correction area surrounding the memory area and having a width to store blank data.

5. An image forming apparatus comprising:
an image reading device to read a document to generate the image data of the document;
the image processing device of claim 1 to perform image processing on the image data; and
an image output device to form and output an image on the output medium based on the image data subjected to the image processing.

6. The image processing device of claim 1, wherein the processing circuitry includes at least one processor.

7. The image processing device of claim 1, wherein the processing circuitry includes at least one of an application specific integrated circuit (ASIC), a digital signal processor (DSP), and a field programmable gate array (FPGA).

8. An image processing method comprising:
writing image data to an image memory;
generating coordinate information based on inclination information, the coordinate information including a coordinate in a main scanning direction and a coordinate in a sub-scanning direction for each of a plurality of pixels of the image data, representing a position of each of the respective pixels of the plurality of pixels of the image data relative to an output medium onto which the image data is to be output, and the inclination information representing an inclination of the image data in the image memory relative to the output medium;

detecting, from the coordinate information, a minimum sub-scanning coordinate in each of a plurality of divided areas of the image data divided in the main scanning direction, the minimum sub-scanning coordinate having a minimum value in the each of the plurality of divided areas of the image data in the sub-scanning direction of the image data;

generating first read addresses for reading the plurality of divided areas of the image data from the image memory based on the minimum sub-scanning coordinate detected in the each of the plurality of divided areas of the image data;

reading the plurality of divided areas of the image data from the image memory based on the first read addresses;

writing the plurality of divided areas of the image data to an internal memory;

generating second read addresses for reading the plurality of divided areas of the image data from the internal memory based on the coordinate information; and reading the plurality of divided areas of the image data from the internal memory based on the second read addresses, such that the image data read from the image memory with an inclination is able to be output to the output medium with inclination of the image data relative to the output medium sheet corrected.

9. The image processing method of claim 8, further comprising:
using the plurality of lines of the storage area in a toggle manner to store the image data in an internal memory, the internal memory including a storage area including a plurality of lines; and
upon completing writing the image data to a relatively last line of the plurality of lines of the internal memory, writing the image data to a line of the plurality of lines of the internal memory written with a line of the image data relatively most distant from the minimum sub-scanning coordinate currently selected.

10. The image processing method of claim 8, wherein the generating the second read addresses includes:
generating a read address for selecting a divided area in the main scanning direction from the plurality of divided areas of the image data in accordance with relatively high-order digits of the coordinate in the main scanning direction of the coordinate information; and
generating an effective read address in the sub-scanning direction of the divided area from relatively, low-order bits of the coordinate in the sub-scanning direction of the coordinate information.

11. The image processing method of claim 8, wherein the image memory has a storage area including a memory area and a correction area, the memory area including a capacity of one page of the image data, and the correction area surrounding the memory area and including a width, the method further comprising:
writing blank data in the correction area.

12. A non-transitory recording medium storing a program for causing a computer to execute an image processing method, the image processing method comprising:
writing image data to an image memory;

generating coordinate information based on inclination information, the coordinate information including a coordinate in a main scanning direction and a coordinate in a sub-scanning direction for each of a plurality of pixels of the image data, representing a position of each of the respective pixels of the plurality of pixels of the image data relative to an output medium onto which the image data is to be output, and the inclination information representing an inclination of the image data in the image memory relative to the output medium;

detecting, from the coordinate information, a minimum sub-scanning coordinate in each of a plurality of divided areas of the image data divided in the main scanning direction, the minimum sub-scanning coordinate having a minimum value in the each of the plurality of divided areas of the image data in the sub-scanning direction of the image data;

generating first read addresses for reading the plurality of divided areas of the image data from the image memory based on the minimum sub-scanning coordinate detected in the each of the plurality of divided areas of the image data;

reading the plurality of divided areas of the image data from the image memory based on the first read addresses;

writing the plurality of divided areas of the image data to an internal memory;

generating second read addresses for reading the plurality of divided areas of the image data from the internal memory based on the coordinate information; and reading the plurality of divided areas of the image data from the internal memory based on the second read addresses, such that the image data read from the image memory with an inclination is able to be output to the output medium with inclination of the image data relative to the output medium sheet corrected.

13. The non-transitory recording medium of claim 12, wherein the image processing method further comprises:
using the plurality of lines of the storage area in a toggle manner to store the image data in an internal memory, the internal memory including a storage area including a plurality of lines; and
upon completing writing the image data to a relatively, last line of the plurality of lines of the internal memory, writing the image data to a line of the plurality of lines of the internal memory written with a line of the image data relatively most distant from the minimum sub-scanning coordinate currently selected.

14. The non-transitory recording medium of claim 12, wherein the generating the second read addresses includes:
generating a read address for selecting a divided area in the main scanning direction from the plurality of divided areas of the image data in accordance with relatively high-order digits of the coordinate in the main scanning direction of the coordinate information; and
generating an effective read address in the sub-scanning direction of the divided area from relatively low-order bits of the coordinate in the sub-scanning direction of the coordinate information.

15. The non-transitory recording medium of claim 12, wherein the image memory includes a storage area including a memory area and a correction area, the memory area including a capacity of one page of the image data, and the correction area surrounding the memory area and having a width, the method further comprising:
writing blank data in the correction area.

* * * * *